W. D. MILLER.
STEERING DEVICE FOR TRACTION ENGINES.
APPLICATION FILED OCT. 24, 1910.
1,009,546.
Patented Nov. 21, 1911.
2 SHEETS—SHEET 1.
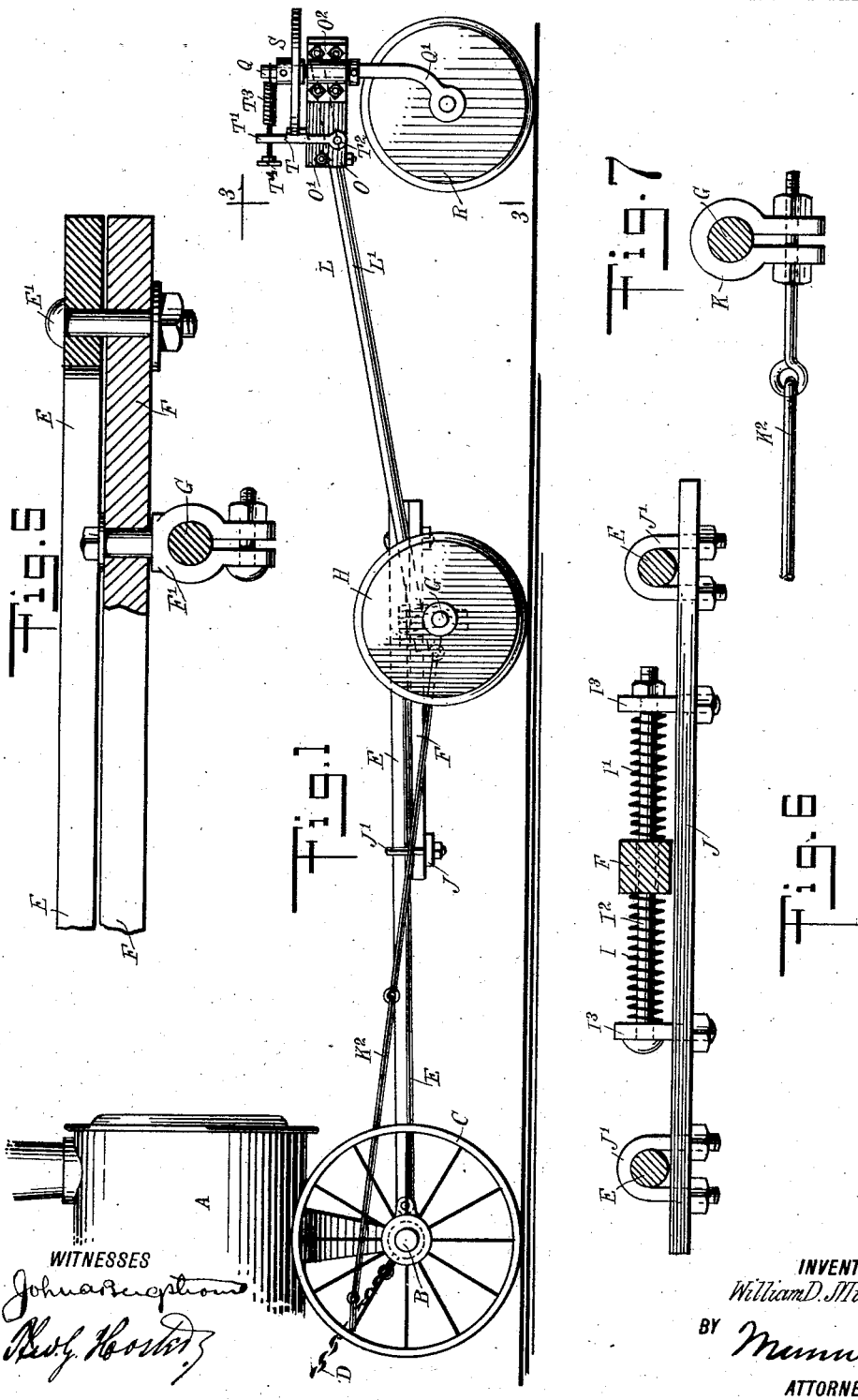
WITNESSES
INVENTOR
William D. Miller
BY
ATTORNEYS W. D. MILLER.
STEERING DEVICE FOR TRACTION ENGINES.
APPLICATION FILED OCT. 24, 1910.
1,009,546.
Patented Nov. 21, 1911.
2 SHEETS—SHEET 2.
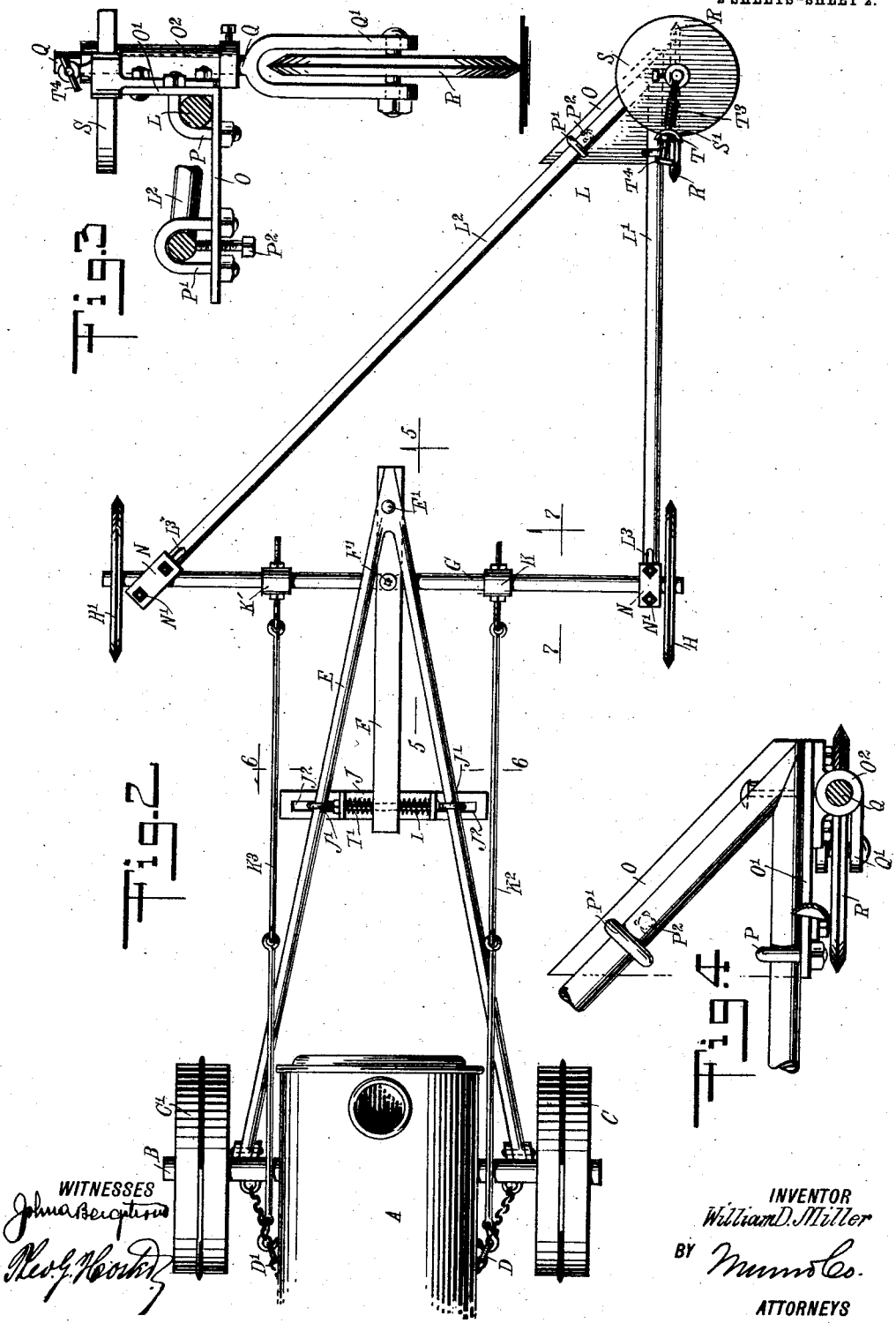

UNITED STATES PATENT OFFICE.

WILLIAM D. MILLER, OF SACO, MONTANA.

STEERING DEVICE FOR TRACTION-ENGINES.

1,009,546.

Specification of Letters Patent. Patented Nov. 21, 1911.

Application filed October 24, 1910. Serial No. 588,605.

*To all whom it may concern:*

Be it known that I, WILLIAM D. MILLER, a citizen of the United States, and a resident of Saco, in the county of Valley and State of Montana, have invented a new and Improved Steering Device for Traction-Engines and the Like, of which the following is a full, clear, and exact description.

The invention relates to traction engines and similar machines used for drawing gang plows over a field, and the object is to provide a new and improved steering device for such machines, whereby the machine is automatically guided across the field in a straight line.

For the purpose mentioned use is made of a pair of steering wheels mounted on the steering axle arranged in front of the traction engine, and an advance guide wheel supported on a frame projecting forwardly from the steering axle, the guide wheel being in alinement with one of the steering wheels.

A practical embodiment of the invention is represented in the accompanying drawings forming a part of this specification, in which similar characters of reference indicate corresponding parts in all the views.

Figure 1 is a side elevation of the steering device as applied to a traction engine; Fig. 2 is a plan view of the same; Fig. 3 is an enlarged cross section of the same on the line 3—3 of Fig. 1; Fig. 4 is a sectional plan view of the front end of the guide wheel frame and the guide wheel, parts being in section; Fig. 5 is an enlarged sectional side elevation of the connection between the steering axle, the tongue and the stub tongue, the section being on the line 5—5 of Fig. 2; Fig. 6 is an enlarged transverse section of the steering device on the line 6—6 of Fig. 2; and Fig. 7 is an enlarged sectional side elevation of the connection between the steering axle and the steering links.

On the body A of the traction engine, or a similar machine, is mounted to oscillate the front axle B carrying the front wheels C, C', the axle B being controlled in its oscillating movement by chains D, D' or other steering mechanism of any approved construction, but not shown. On the front axle B is pivoted to swing up and down a forwardly projecting V-shaped tongue E, on the apex of the forward end of which is pivoted at E' a rearwardly-extending stub tongue F, pivotally connected at F' with the steering axle G carrying the steering wheels H, H', of which the wheel H is adapted to travel in a furrow made by a previous operation. The rear end of the stub tongue F is pressed on opposite sides by springs I, I' coiled on a rod $I^2$ extending transversely and loosely through the stub tongue F, the ends of the rod $I^2$ being secured in brackets $I^3$ attached to a transversely-extending bar J fastened by clips J' to the side arms of the main tongue E, as plainly indicated in Figs. 1, 2 and 6. The clips J' are held transversely adjustable on the bar J by passing through elongated slots $J^2$ formed on the said bar, as indicated in Fig. 2, to permit of shifting the bar J and hence the stub tongue F and with it the steering axle G and the steering wheels H, H' farther to one side or the other so as to steer the traction engine closer to or farther from the furrow. By the arrangement described, the stub tongue F connected with the steering axle G by the pivot F' is free to swing in a lateral direction independently of the tongue E, thus allowing sidewise movement of the wheels H, H' for the latter to readily follow the furrows. On the steering axle G are secured clips K, K' connected by links $K^2$, $K^3$ with the chains D, D', so that when the steering mechanism of the traction engine is actuated, a like motion is given to both axles B and G, to permit of steering the traction engine around corners.

From the steering axle G extends forwardly a V-shaped frame L having side bars L', $L^2$ adjustably connected by clips N with the axle G, the said side bars being provided with elongated slots $L^3$ engaged by the bolts N' of the clips N to permit of adjusting the said frame L forwardly or backwardly as the case may be. To the forward end of the frame L is secured a bearing plate O by the use of clips P and P' engaging the side arms L', $L^2$ of the frame L, and a set screw $P^2$ screwing in the bearing plate O and engaging the under side of the side arm $L^2$ permits tilting of the said frame L and the bearing plate O, one relative to the other (see Fig. 3). The bearing plate O is provided with an upwardly-extending flange O', on which is bolted or otherwise secured a bearing $O^2$ in which is journaled a vertically-disposed shaft Q terminating at its lower end in a rearwardly-extending fork Q' in which is journaled a guide wheel R extending normally in alinement with the steering wheel H, as plainly indicated in Fig. 2. On the upper end of the shaft Q is secured a locking disk S having a cut out portion S', into which fits a locking shoe T, held on a vertical lever T' fulcrumed at T² on the bearing plate O and pressed on at its upper end by a spring T³ to normally hold the shoe T in engagement with the cut out portion S'. The tension of the spring T³ can be adjusted by a screw T⁴ screwing in the lever T'. Now when the shoe T is in engagement with the cut out portion S' of the disk S then the guide wheel R is in longitudinal alinement with the steering wheel H, but when the machine is steered to one side and the steering axle G is turned at its pivot F' then the guide wheel R causes its shaft Q to turn whereby the shoe T leaves the cut out portion S' and when the machine again reaches a straight portion of its travel then the guide wheel R returns to its alined position by the action of the spring T³ to return the shoe T to normal position in the cut out portion S' of the disk S.

It is understood that the guide rods K², K³ and chains D, D' allow the axle G some play, and although under ordinary conditions the wheels H, H' guide sufficiently for straight steering the tendency is to lead the wheels H, H' to that side that takes the most power to push the machine ahead. To overcome this tendency use is made of the guide wheel R arranged in advance of the steering wheels H, H' in alinement with the steering wheel H. The steering wheel H and the guide wheel R travel in the furrow, and the guide wheel R automatically controls the axle G and hence steers the wheels H, H' properly.

Having thus described my invention, I claim as new and desire to secure by Letters Patent:

1. A steering device for traction engines and the like, comprising a tongue connected with the front axle of the traction engine, an axle pivotally connected with the said tongue and carrying steering wheels, means whereby the axle will be turned in unison with the front axle of the engine, an advance guide wheel, and a frame carrying the guide wheel and attached to the axle of the steering device.

2. A steering device for traction engines and the like, comprising a tongue pivotally connected with the front axle of the traction engine, an axle pivotally connected with the said tongue and carrying steering wheels, means for turning the axle in unison with the front axle of the engine, an advance guide wheel, and a frame carrying the guide wheel and attached to the axle of the steering device, the said guide wheel extending normally in longitudinal alinement with one of the said steering wheels.

3. A steering device for traction engines and the like, comprising a tongue connected with the traction engine, an axle pivotally connected with the said tongue and carrying steering wheels, a frame attached to and projecting forwardly from the said axle, a vertically-disposed shaft journaled on the forward end of the said frame, and a guide wheel journaled on the said shaft.

4. A steering device for traction engines and the like, comprising a tongue connected with the traction engine, an axle pivotally connected with the said tongue and carrying steering wheels, a frame attached to and projecting forwardly from the said axle, a vertically-disposed shaft journaled on the forward end of the said frame, a guide wheel journaled on the said shaft, and spring-controlled locking means for the said shaft to normally hold the guide wheel in alinement with one of the steering wheels and to allow the shaft to turn for the guide wheel to assume an angular position relative to the straight path in which the traction engine is traveling.

5. A steering device for traction engines and the like, comprising a tongue connected with the traction engine, an axle pivotally connected with the said tongue and carrying steering wheels, a frame attached to and projecting forwardly from the said axle, a tiltable bearing mounted on the forward end of the said frame, a vertical shaft journaled in the said bearing, and a guide wheel journaled on the said shaft.

6. A steering device for traction engines and the like, comprising a tongue projecting from the forward end of the traction engine, a steering axle carrying steering wheels, a stub tongue pivotally connected with the said tongue and on which the steering axle is pivoted, and springs pressing the stub tongue on opposite sides thereof.

7. A steering device for traction engines and the like, comprising a tongue projecting from the forward end of the traction engine, a steering axle carrying steering wheels, a stub tongue pivotally connected with the said tongue and on which the steering axle is pivoted, a transverse bar attached to the said tongue, and springs carried by the said bar and pressing opposite sides of the said stub tongue.

8. A steering device for traction engines and the like, comprising a tongue projecting from the forward end of the traction engine, a steering axle carrying steering wheels, a stub tongue pivotally connected with the said tongue and on which the said steering axle is pivoted, springs pressing the stub tongue on opposite sides thereof, and means for turning the said steering axle.

9. In a steering device for traction engines, the combination with a steering axle, wheels on the axle, and means for connecting the axle with a traction engine, of a frame secured to the steering axle, a bearing at the forward end of the frame, means for tilting the bearing, and a guide wheel mounted in said bearing.

10. In a steering device for traction engines, the combination with a steering axle, wheels on the axle, and means for connecting the axle with a traction engine, of a frame secured to the axle, a bearing on the front end of the frame, a guide wheel having a vertical shaft mounted in the bearing, a notched disk on the upper end of the shaft, and a spring pressed shoe engaging the notch of said disk.

11. In a steering device for traction engines, a tongue pivotally connected with the engine, an axle, steering wheels on the axle, a member pivoted intermediate of its ends to the axle and to one end of which the tongue is pivoted, and yielding means for the other end of said member.

12. In a steering device for traction engines, a tongue pivoted to the front axle of the engine, an axle, steering wheels on the said axle, a member pivoted intermediate of its ends to the axle and having one end pivoted to the end of the tongue, and its other end yieldingly connected with said tongue.

13. In a steering device for traction engines, a tongue pivoted to the front axle of the engine, an axle, steering wheels on said axle, a member pivoted intermediate of its ends to the axle and having one end pivoted to the tongue, yielding means for the other end of the member, and means for adjusting the yielding means.

14. In a steering device for traction engines, a tongue pivoted to the front axle of the engine, an axle, steering wheels on the axle, means for pivotally connecting the axle with the tongue, a forwardly extending frame secured to the axle of the steering wheels, a guide wheel carried by said frame and in alinement with one of the steering wheels, and a connection between the said axle and the steering means of the engine.

15. In a steering device for traction engines, a tongue pivoted to the front axle of the engine, an axle, steering wheels on said axle, means for pivotally connecting the axle with the tongue, a forwardly extending V-shaped frame having the rear ends of its members adjustably secured to the axle of the steering device, and a guide wheel mounted in the forward end of the frame in alinement with one of the steering wheels.

In testimony whereof I have signed my name to this specification in the presence of two subscribing witnesses.

WILLIAM D. MILLER.

Witnesses:
   Roy De Noma,
   Edward Rognas.

---

Copies of this patent may be obtained for five cents each, by addressing the "Commissioner of Patents, Washington, D. C."